July 24, 1973 A. C. M. CHEN ET AL 3,748,174

THIN FILM NICKEL TEMPERATURE SENSOR

Original Filed Dec. 30, 1968 2 Sheets-Sheet 1

3,748,174

THIN FILM NICKEL TEMPERATURE SENSOR

Arthur C. M. Chen and James M. Lommel, Schenectady, N.Y., assignors to General Electric Company Original application Dec. 30, 1968, Ser. No. 787,685, now Patent No. 3,660,158. Divided and this application Aug. 6, 1971, Ser. No. 169,850
Int. Cl. H01c 7/02; G01k 7/22
U.S. Cl. 117—217 3 Claims

ABSTRACT OF THE DISCLOSURE

Thin film nickel temperature sensors having a temperature coefficient of resistance of above +0.2%/° C. and a resistance above 0.35 ohm per square are formed by electron beam evaporation of a high purity nickel source at pressures below $8\times10^{-6}$ torr and deposition of the evaporated nickel atop a dielectric substrate, e.g. a polyimide film, heated above 60° C. The nickel film preferably is deposited to a thickness between 250 A. and 3000 A. and masking is employed to produce a desired configuration in the deposited nickel film. To stabilize the resistance of the deposited nickel film, a dielectric encapsulant such as alumina, silica, a polyimide or a fluorocarbon then is overlayed upon the film by conventional vacuum deposition or bonding techniques.

CROSS REFERENCE TO RELATED APPLICATION

This application is a division of application Ser. No. 787,685, filed Dec. 30, 1968, now Pat. No. 3,660,158, and assigned to the assignee of the present invention.

BACKGROUND OF THE INVENTION

(1) Field of the invention

This invention relates to thin film nickel temperature sensors and to a method of forming such sensors. In a more particular aspect, this invention relates to high purity nickel films characterized by a high resistance and a high positive temperature coefficient of resistance, i.e. the percentage change of film resistance referred to the resistance of the film at a given reference temperature (hereinafter referred to by the term TCR), and a method of forming the nickel films by electron beam evaporation.

(2) Description of the prior art

Temperature sensors of various materials and diverse physical configurations heretofore have been employed in association with sophisticated electrical circuitry for thermal control purposes. Ideally, temperature sensors are characterized by a high positive TCR to provide a highly sensitive, fail safe thermal control element while incorporation of the temperature sensor into inexpensive electronic circuitry generally requires a sensor characterized by a high resistance, e.g. a resistance in the order of kilohms. Although bulk nickel is known to possess an extremely high positive TCR of approximately +0.6%/° C., the fragility of bulk nickel negates the fabrication of wire sensors below approximately 1 mil diameter thereby necessitating very long length nickel wires for high resistance sensors. Prior attempts to increase the resistance of nickel temperature sensors by thin film deposition techniques, e.g. filament evaporation from a tungsten coil, generally has resulted in an associated reduction in the positive TCR of the deposited film by an order of magnitude relative to the TCR of bulk nickel.

It is therefore an object of this invention to provide a high resistance, high positive TCR nickel thin film temperature sensor.

It is also an object of this invention to provide a thin film nickel temperature sensor having superior adhesion to the substrate.

It is an object of this invention to provide a stable nickel film temperature sensor.

It is a still further object of this invention to provide a method of forming a high resistance, high positive TCR nickel film.

SUMMARY OF THE INVENTION

These and other objects of this invention generally are achieved by positioning a dielectric substrate and a high purity nickel source at spaced apart locations within a deposition chamber whereupon the chamber is exhausted to produce a pressure less than $8\times10^{-6}$ torr. The nickel source then is heated by an electron beam to vaporize a portion of the nickel source and the vaporized nickel is deposited through a selectively apertured mask upon a substrate heated above 60° C. with deposition being continued until a nickel film having a thickness between 250 A. and 3000 A. is formed upon the substrate. Thus a temperature sensor formed in accordance with this invention is characterized by a dielectric substrate having a high purity nickel film in a thickness between 250 A. and 3000 A. deposited thereon. The nickel film is further distinguished by a positive TCR above +0.2% and a resistance above 0.35 ohm/sq. In a particularly desirable configuration, a polyimide film is employed as the dielectric substrate and the nickel thin film is encapsulated with an overlying polyimide or a fluoroethylene film.

BRIEF DESCRIPTION OF THE DRAWINGS

The novel features believed characteristic of the invention are set forth in the appended claims. The invention itself, together with further objects and advantages thereof may best be understood by reference to the following description, taken in connection with the accompanying drawings, in which:

DESCRIPTION OF THE PREFERRED EMBODIMENT

Figure 1:
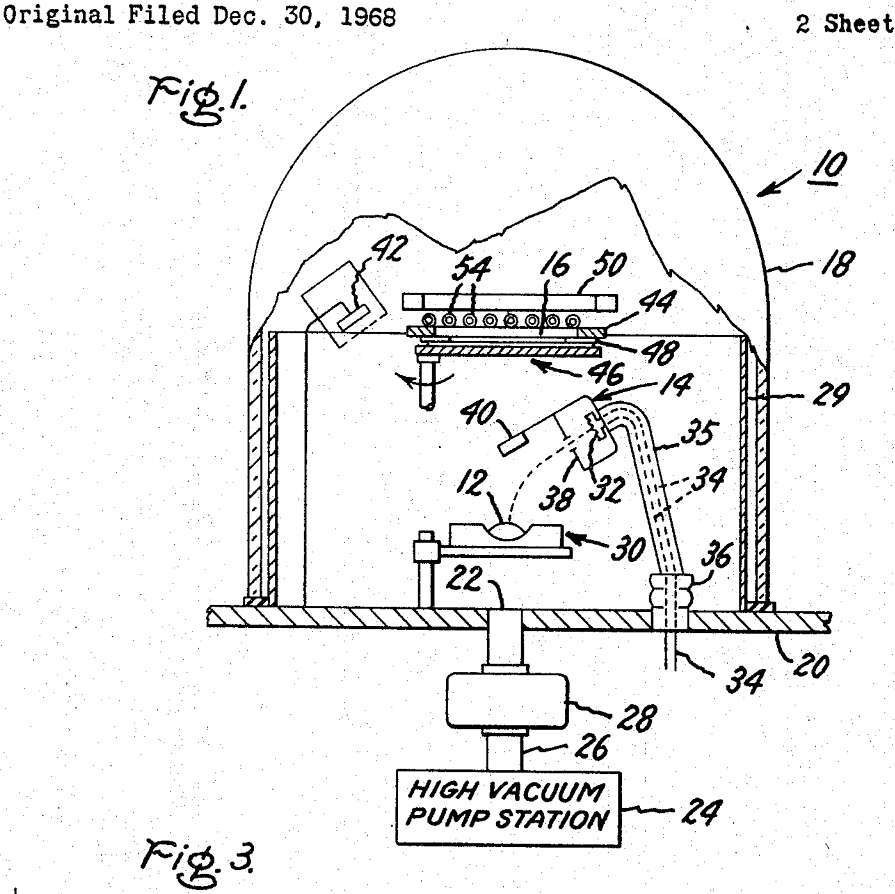
FIG. 1 is a sectional view of a deposition chamber suitable for forming thin film nickel temperature sensors in accordance with this invention.

A deposition chamber 10 suitable for forming nickel thin film temperature sensor in accordance with this invention is illustrated in FIG. 1 and generally comprises a high purity nickel source 12, an electron beam gun 14 for the evaporation of source 12 and a substrate 16 upon which the evaporated nickel is deposited to form the thin film temperature sensor of this invention. Deposition chamber 10 generally is enclosed by a glass envelope 18 seated upon a circular base 20 having an aperture 22 centrally disposed therein to permit exhaust of the chamber by a conventional high vacuum pump station 24 through conduit 26. A liquid nitrogen trap 28 is inserted along the length of conduit 26 intermediate pump station 24 and base 20 to serve as a baffle inhibiting contamination of the chamber by backflowing gases. To prevent charge build-up on glass envelope 18 during evaporation of source 12 and to reduce X-ray emission from the deposition chamber, a cylindrical stainless steel shield 29 is interposed between electron beam gun 14 and the glass envelope along a length of chamber 10 extending from base 20 to substrate 16.

Nickel source 12 preferably is of extremely high purity, e.g. 99.99% nickel, and is seated in ingot form within water cooled crucible 30 to permit electron beam melting of a small area of the ingot without an associated heating of the crucible. Because the molten nickel is contained within a cavity of the ingot during evaporation, impurities from crucible 30 tending to reduce the positive TCR of the deposited nickel film are reduced.

Electron beam gun 14 employed for evaporation of the nickel source is conventional in design and includes a cathode 32 suitably energized by conductors 34 extending through pedestal 35 and porcelain insulator 36 in base 20. Electrons emitted from the cathode are accelerated by apertured anode 38 having a positive potential, e.g. +15 kv., relative to cathode 32 and the electrons upon passing through the apertured anode are deflected by an electrostatic plate 40 to impinge upon a small area of nickel source 12. In general, the energization of cathode 32 is dependent upon the desired rate of nickel deposition upon substrate 16 with deposition rates of approximately 3–8 A. per second being produced by a cathode energization of approximately 1 kw. while a 2–2.5 kw. energization of the cathode produces a substantially higher deposition rate of between 30 and 100 A. per second. A shielded quartz crystal monitor 42 is disposed within the deposition chamber in a generally confronting attitude relative to source 12 to permit an accurate measurement of the thickness of the nickel film deposited on substrate 16.

Substrate 16 upon which the nickel film is to be deposited is disposed within a frame 44 suitably mounted in a generally overlying attitude relative to source 12. A rotatable shutter 46 is positioned within the chamber intermediate source 12 and substrate 16 to control initiation and termination of nickel deposition upon the substrate while a suitably apertured mask 48 is situated in an underlying attitude relative to the face of the substrate proximate the source to control the configuration of the nickel film deposited thereon. Heating of the substrate to a desired temperature between 60° C. and 300° C. during the nickel film deposition is achieved employing a quartz lamp heater 50 overlying the face of the substrate remote from the source. To permit rapid removal of the substrate from the chamber after deposition of the nickel film thereon, a water cooled coil 54 is disposed atop the face of the substrate remote from the source for controlled conductive cooling of the substrate.

In forming a high TCR nickel film in accordance with this invention, a high purity, e.g. 99.99% pure, nickel ingot source is positioned within water cooled crucible 30 and a dielectric substrate 16 is positioned within frame 44 at a suitable distance, e.g. 20 cm., from the nickel source whereupon the chamber is sealed and vacuum pump 24 is activated to reduce the pressure in the chamber to approximately $3\times10^{-7}$ torr for the 20 cm. source to substrate distance. In general, the vacuum required for nickel film deposition in accordance with this invention is dependent upon associated deposition conditions such as the source to substrate span and the deposition rate employed to form the nickel film. Desirably, electron beam evaporation of source 12 is conducted in a pressure less than $8\times10^{-6}$ torr to produce a high purity nickel thin film having a high positive TCR. For depositions on substrates having a relatively low maximum operating temperature, e.g. below 300° C., a pressure less than $1\times10^{-6}$ torr preferably is employed to assure a high purity and high TCR in the deposited film.

With shutter 46 in an underlying position relative to the substrate to shield the substrate from nickel deposition thereon, electron beam gun 14 is energized to initiate evaporation of source 12 and effect both a gettering in any residual gases remaining in the pumped chamber and an outgassing of the nickel source. During exhaust and gettering of chamber 10, quartz lamp heater 50 is energized to raise the temperature of substrate 16 above 60° C. in preparation for nickel film deposition thereon. Upon heating of the electron irradiated portion of nickel source to a desired temperature to effect a relatively high deposition rate upon substrate 16, e.g. preferably between 30 A. and 100 A. per second, shutter 46 is rotated from an underlying position relative to the substrate and the evaporated nickel is deposited through mask 48 upon the substrate to a thickness between 250 A. and 3000 A. to form a serpentine nickel film 56 illustrated in the temperature sensor of FIG. 2.

Figures 2, 3:
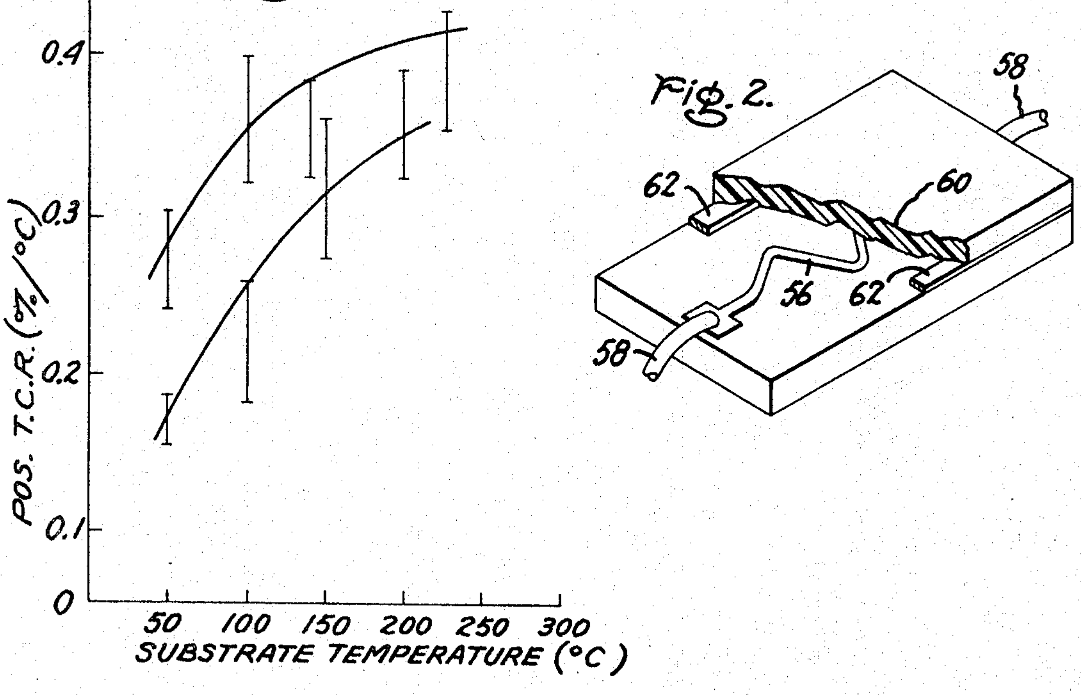
FIG. 2 is a partially exposed isometric view of a nickel film temperature sensor in accordance with this invention.
FIG. 3 is a graph illustrating the variation in positive TCR of nickel thin films on polyimide film substrates with the deposition rate and substrate temperature employed during film formation.

As can be seen from the graph of FIG. 3 depicting the variation of positive TCR (relative to a 50° C. reference temperature) for a 1000 A. nickel film vacuum evaporated at $3\times10^{-7}$ torr upon a polyimide substrate situated 20 cm. from the source, the TCR of the deposited nickel film varies directly with both the substrate temperature and the deposition rate employed during the film deposition. In general, a 0.1%/° C. increase in the TCR of the deposited nickel film is obtained using a deposition rate in excess of 30 A. per second relative to the nickel films deposited under otherwise identical conditions at deposition rates below 8 A. per second. Similarly, the TCR of the deposited nickel film increased with increasing substrate temperatures and TCR's above 0.3% were obtained only employing substrate temperatures in excess of approximately 60° C. Because of the increase in TCR with substrate temperature, polyimide films chosen for the temperature sensor should be characterized by a permissible operating temperature above 60° C. Du Pont Kapton H films are relatively insensitive to temperatures up to 300° C. and preferably are utilized as the polyimide substrate for the temperature sensor. Optimally, a deposition rate between 70–80 A./sec. and a substrate temperature between 150° C. and 225° C. are employed for nickel film depositions at $3\times10^{-7}$ torr upon a polyimide substrate positioned approximately 20 cm. from the source.

Figure 4:
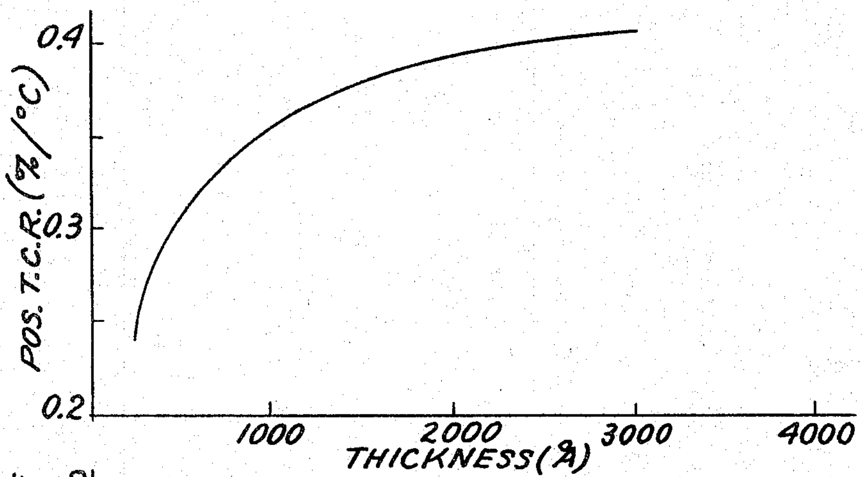
FIG. 4 is a graph illustrating the variation in positive TCR of nickel films on polyimide film substrates with film thickness.
Figure 5:
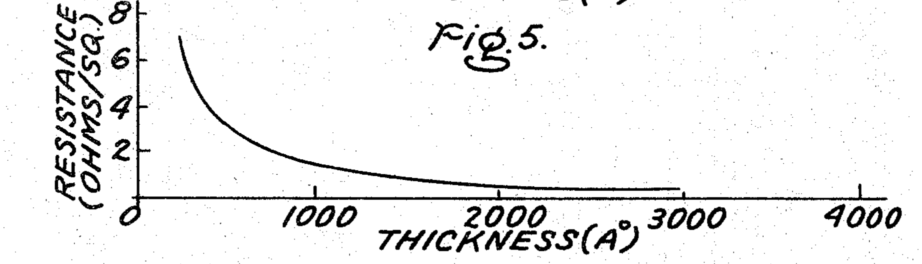
FIG. 5 is a graph illustrating the variation in the resistance per square of nickel thin films with film thickness.

As is depicted in the graph of FIG. 4, the positive TCR (employing a reference temperature of 50° C.) of a nickel iron film deposited at a preferred rate between 70–80 A./sec. upon a polyimide substrate at 225° C. situated 20 cm. from the source generally increases with increasing thickness in the deposited film. Although the nickel films employed to chart the graphs of FIG. 4 were annealed at 200° C. for 2 hours at $3\times10^{-7}$ torr, annealing did not appear to alter the film characteristics relative to unannealed films. Nickel films having a TCR above +0.3%/° C. were obtained only in films deposited to a thickness in excess of 500 A. while 3000 A. thick nickel films exhibited a TCR above 0.4%/° C. However as can be seen from the graph of FIG. 5 illustrating the variation in resistance with the thickness of the nickel films employed in charting the curves of FIG. 4, increasing thickness in the deposited nickel film tends to substantially reduce the resistance of the film. Thus while a 750° A. film exhibits a resistance of approximately 2 ohms/sq., a 1000 A. film exhibits a resistance of 1.25 ohms/sq. and a 3000 A. film exhibits a reduced resistance of 0.35 ohm/sq. In general, a superior combination of resistance and TCR characteristics for a thermal sensor is obtained in nickel films deposited to thicknesses between 750 A. and 1500 A. with approximately 1000 A. thick nickel films characterized by a 0.35%/° C. positive TCR and a resistance of 1.25 ohms/sq., e.g., 2.5 kilohm resistance for a 2 mil wide resistor four inches long, generally being found to be optimum for a thermal sensor. The thickness of the deposited film however can be varied generally between 250 A. and 3000 A. when specific film characteristics, e.g. an extremely high TCR, are desired without destroying the suitability of the deposited nickel film for use as a temperature sensor in accordance with this invention.

Subsequent to the deposition of the high purity nickel film upon substrate 16, conductive leads 58 are attached to opposite ends of the resistor film in a conventional fashion, e.g. by solder connection of nickel conductors to the nickel film. The resistor film then is encapsulated with a dielectric material compatible with the nickel film and the substrate, e.g. for a glass substrate, vacuum deposition of a refractory metal oxide such as silicon dioxide or aluminum oxide can effectively seal environmental gases from the resistor film while a nickel film deposited on a polyimide film substrate can be encapsulated by bonding a polyimide film 60 to the substrate using a suitable bonding adhesive 62, e.g. Goodrich Plastilock 605 Break Bonding Adhesive at 75° C. employing a bonding pressure of 100 p.s.i. for 20 minutes. Preferably the bonding adhesive is applied only along the substrate periphery remote from the deposited nickel film to inhibit contamination of the nickel film by the bonding adhesive. Rapid encapsulation of a nickel film on a polyimide substrate also can be effected by bonding a fluoroethylene film, e.g. a polytetrafluoroethylene film, to the polyimide substrate using a silicone adhesive. Because it was found that the silicone adhesive is nondeleterious to the deposited nickel film, the adhesive can be applied indiscriminately to both the substrate and nickel film. High positive TCR nickel films encapsulated by fluoroethylene films employing silicone adhesive exhibited a resistance deviation of less than 0.3% at 50° C. when formed without the benefit of either an initial aging period or a vacuum anneal subsequent to nickel deposition. To assure rapid heat conduction to the encapsulated nickel film, substrate 16 and the overlying dielectric encapsulant desirably are less than 4 mils in thickness.

Figure 6:
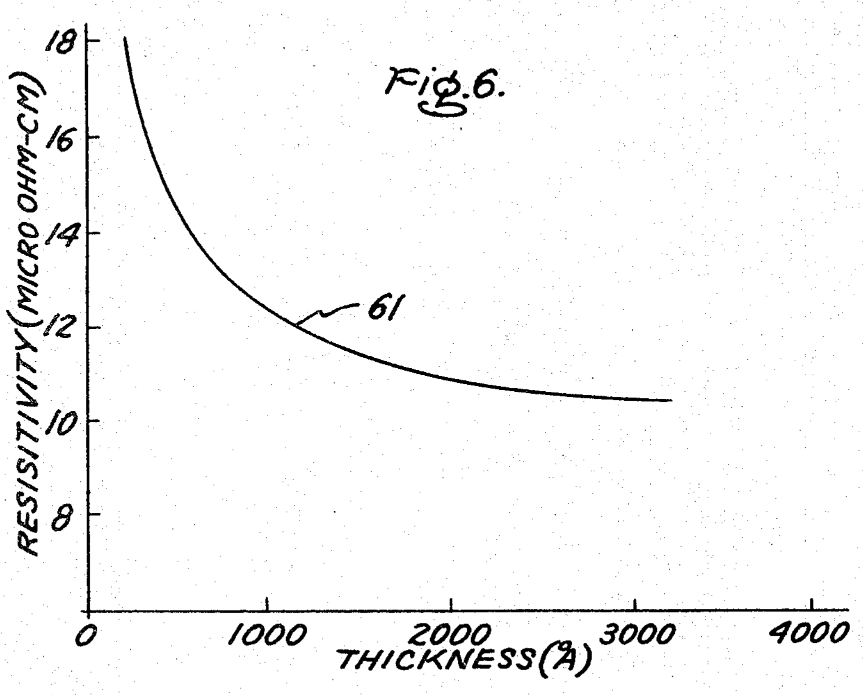
FIG. 6 is a graph illustrating the variation in resistivity with thickness for nickel thin films vacuum deposited on polyimide substrates.

The influence of polyimide film substrates upon the resistivity of nickel films deposited thereon is illustrated in FIG. 6 wherein are depicted the characteristics of nickel films evaporated at $3\times10^{-7}$ torr and deposited at approximately 80 A. per second upon a 150° C. Du Pont Kapton H film polyimide substrate situated 20 cm. from the nickel source. The nickel films also were vacuum annealed for 2 hours at 150° C. in the $3\times10^{-7}$ torr vacuum of the chamber whereupon the resistivity of films of various thicknesses were measured relative to a 50° C. reference temperature to produce curve 61 of FIG. 6. As can be seen from curve 61, the resistivity of nickel films deposited on polyimide substrates decreases with increasing thickness and asymptomatically approaches a value in excess of approximately 10 $\mu$ohms-cm. at thicknesses above 2000 A. compared to a constant resistivity of approximately 8.3 $\mu$ohms-cm. characteristic of bulk nickel. While the variation in resistivity of the deposited nickel film relative to bulk nickel can be explained in part by the presence of scratches upon the polyimide substrate, evidence indicates that a chemical interaction between the deposited nickel film and the polyimide substrate accounts for at least a portion of the increased resistivity of the deposited nickel films. The chemical interaction of the polyimide substrate with the deposited nickel film was illustrated in attempts to form thermal sensors by photoetching nickel films deposited on polyimide substrates employing deposition conditions identical to those employed in forming the thermal sensor of FIG. 2. Upon photoetching of the deposited nickel film however, a continuous conductive residue having an unstable negative TCR remained on the polyimide substrate surface suggesting the formation of a nonmetallic compound at the interface between the nickel and the polyimide film. It is postulated that the chemical interaction between the polyimide substrate and nickel film results from the high initial surface temperature of the polyimide film upon exposure to the electron beam melted nickel. For high surface heating of the polyimide film to enhance the interaction, a source to substrate span less than 35 cm. generally is desired.

The high temperature of the polyimide substrate during deposition also promotes good nickel film adhesion. For example nickel films deposited upon unheated polyimide film substrates exhibit poor adhesion thereto while nickel films deposited under otherwise identical conditions upon polyimide substrates heated between 150 and 200° C. were characterized by an excellent adhesion, e.g. superior to the adhesion of nickel films deposited upon glass substrates under identical deposition conditions.

What we claim as new and desire to secure by Letters Patent of the United States is:

1. A temperature sensor comprising a dielectric substrate of polyimide film having an operating temperature above 60° C. and a high purity thin nickel film between 250 A. and 3000 A. in thickness deposited atop said substrate, said nickel film characterized by a resistivity above 9 $\mu$ohm-cm. and a positive temperature coefficient of resistance above 0.3%/° C. and further including an encapsulating layer overlying said nickel film.

2. A temperature sensor according to claim 1 wherein said high purity nickel film is between 750 A. and 1500 A. in thickness.

3. A temperature sensor according to claim 1 wherein said encapsulating layer is a material selected from the group consisting of a polyimide and a fluoroethylene.

References Cited

UNITED STATES PATENTS 2,808,345 10/1957 Traub ............... 117—107
3,118,785 1/1964 Anderson et al. ....... 117—218

CAMERON K. WEIFFENBACH, Primary Examiner

U.S. Cl. X.R.

29—612; 117—107, 227, 218; 338—22, 23